3,051,700
CATIONIC, NITROGENATED, STARCH PRODUCTS CONTAINING AT LEAST FIFTY PERCENT AMYLOSE
Lee H. Elizer, Glen C. Glasscock, and John M. Seitz, Keokuk, Iowa, assignors to The Hubinger Company, Keokuk, Iowa, a corporation of Iowa
No Drawing. Filed July 17, 1959, Ser. No. 827,715
5 Claims. (Cl. 260—233.3)

This invention relates to new substituted high amylose starch products and to processes for making them.

Starches generally are composed of two structurally different polysaccharides, amylose and amylopectin. Although both are composed of D-glucopyranose units, amylose is a linear molecule and amylopectin is a branched chain structure. Gelatinization of high-amylose content starches containing about 50% or more amylose, such as the starch obtained from the Bear Hybrid variety corn, which averages about 50% amylose, and other hybrid varieties containing starch having an amylose content as high as 82%, requires autoclaving under pressure. This requirement for paste formation is both inconvenient and costly. The pastes, furthermore, are unstable, since the starch tends to separate from the water.

The object of this invention is to provide cationic, nitrogen-containing, high-amylose content, starch products, which can be employed to make stable cationic starch pastes at ambient pressure and at temperatures substantially below the boiling point of the aqueous slurry.

Another object is to provide new methods for making said cationic, nitrogenated starch products.

Still another object is to provide new cationic nitrogen-substituted, high-amylose content starch products possessing important advantages, such as reduced gelatinization temperature, improved paste viscosity, retention of paste stability and fluidity after cooling and standing, and improved affinity for negatively charged materials, as, for example, cellulose.

Other objects and advantages will become obvious from the following description.

We have discovered that when a high-amylose content starch, namely a starch containing about 50% or more of amylose, is treated with an aqueous alkaline solution of cyanamide, it reacts to form new cationic nitrogenated products. These nitrogenated products, when acidified, form stable cationic acid salts, which gelatinize at ambient pressures and at temperatures frequently below those required to gelatinize high-amylopectin content starches. The aqueous, alkaline cyanamide solution can be prepared by dissolving cyanamide in a solution of an alkali or alkaline earth metal base or by dissolving an alkali or alkaline earth metal cyanamide in water.

It will be understood that both in the specification and claims, the alkali metal or alkaline earth metal cyanamides include both the completely metallated cyanamide, such as $CaNCN$ or $Na_2NCN$, or the partially metallated cyanamides, such as $Ca(HNCN)_2$ or $NaHNCN$. It will be further understood that the percentage of amylose refers to the proportion of total starch present which is amylose and not necessarily to a weight percent of the entire material being treated.

Conditions essential for the desired reaction include an aqueous solvent medium and an alkaline reaction mixture. For appreciable nitrogen add-on and cationicity, the pH should be above 7, preferably at least about pH 8.5, and preferably in the range of about 10 to 12.5 or higher. Any tendency for the nitrogenated starch to gelatinize at a pH above 12 or 12.5 can be avoided by use of a gelatinization inhibitor.

Reaction of the granular starch with the cyanamide occurs at any temperature from the freezing to the boiling point of the reaction mixture. In general, reaction rate increases with increasing temperature. Thus, for rapid nitrogenation, the temperature can be elevated, as, for example, to 120° F. or higher. Digestion periods at substantially elevated temperatures are preferably shortened since, after a point of maximum substitution at the given reagent concentration, decomposition or rearrangement may set in, as demonstrated by some nitrogen loss.

Other conditions, such as the ratio of the cyanamide to the starch, the concentration of the cyanamide dissolved in the aqueous reaction mixture, or the time of reaction, are not critical, although they do influence the extent of nitrogen substitution in the starch molecule. For example, higher ratios of total cyanamide to the starch tends to increase the degree of substitution.

The precise nature of the reaction mechanism or of the substituent nitrogen-containing radicals is not yet completely understood. It is likely that the reactive hydroxyl groups of the starch molecule participate in the reaction. When an alkali metal or alkaline earth metal cyanamide is dissolved in water or when cyanamide is dissolved in an alkali solution of an alkali metal or an alkaline earth metal base, the $(HNCN)^-$ ion is formed. We consider it probable that this ion is the reactive agent. It will be understood, however, that the invention is not to be restricted by the foregoing hypothesis.

As aforementioned, the nitrogen-containing reagent must be cyanamide dissolved in an aqueous solution of an alkali metal or alkaline earth metal base, such as sodium, potassium, lithium, calcium, barium or strontium hydroxide, or their basic salts, or an aqueous solution of an alkali metal or alkaline earth metal cyanamide, such as sodium, potassium or calcium cyanamide. It is ordinarily not necessary to add a base to a solution of the cyanamide salt to produce the desired alkalinity since solutions of such salts in water generally are sufficiently alkaline. An aqueous solution of calcium cyanamide, for example, generally has a pH in the range of about 10.5 to 11.9. An alkali metal or alkaline earth metal cyanamide hydrolyzes in water to form a solution which is substantially similar to an aqueous solution of cyanamide in an alkaline solution of an alkali metal or alkaline earth metal base. In general, we prefer to employ calcium cyanamide because of its availability, low cost and high efficiency.

The high-amylose content starch can be treated in its unmodified granular form or in the form of a thin-boil starch which has been moderately hydrolyzed to reduce its viscosity. The Bear Hybrid variety corn starch, which averages about 50% or more amylose is currently in production. Other hybrid varieties of even higher amylose content are being developed.

The starch-alkaline cyanamide reaction mixture can be prepared in various ways. An aqueous alkaline cyanamide solution can be separately prepared and added to an aqueous starch slurry; the alkaline cyanamide salt or cyanamide and alkaline base can be dissolved directly in the aqueous starch slurry; or the starch can be directly slurried in an aqueous alkaline solution of the cyanamide.

The reaction mixture is maintained at the desired reaction temperature for a sufficient length of time to obtain the desired degree of nitrogen substitution. Reaction occurs at a substantial rate at reduced to ordinary temperatures. This is an advantage where elevated temperatures are either unfeasible or undesirable. For more rapid reaction rates, the reaction temperature can be increased. There is ordinarily no economic advantage in continuing the reaction period beyond the point at which the desired or maximum degree of substitution is achieved. In some cases, particularly at elevated temperatures, there may be some loss of substituted nitrogen with prolonged treatment, although a cationic, nitrogenated product can still be obtained.

The minimum substitution to produce a desirable product is preferably about 1.4 moles $N_2$ per 100 anhydroglucopyranose units (AGU). Nitrogen substitution can be increased as much as desired up to as much as 8 or more moles $N_2/100$ AGU.

The granular, nitrogenated, basic starch products can be separated from the alkaline reaction mixture, washed and dried. Since they do not gelatinize readily, they are preferably employed as dry starches, as, for example, in dusting powders and the like. They are particularly useful as intermediates in the preparation of the cationic acid salts.

The acid salt derivatives can be prapared from the dried parent nitrogenated starch base by reslurrying in water and acidifying. Ordinarily they are most conveniently prepared by acidification of the alkaline starch-cyanamide aqueous reaction slurry with the particular acid, the derivative of which is desired. The pH is preferably reduced to 4 or less, in some cases, to as low as 1 or less. Where operational expediency requires that the cyanamide reaction period be short, it may be desirable to dry the treated starch derivative without washing prior to acidification, since this increases the nitrogen add-on.

Substantially any acid can be used, including inorganic and organic acids, such as hydrochloric, nitric, sulfuric, sulfurous, phosphoric, carbonic, sulfamic, acetic, propionic acids, phenol, and the like. In general, we prefer to employ hydrochloric, nitric, phoosphoric, sulfamic, or sulfurous acid.

The acidification treatment can be carried out at reduced, ambient, or elevated temperatures, as, for example, the temperature of the initial nitrogenation reaction. After the acid treatment is completed, it is desirable to remove excess acid before drying the nitrogenated starch acid salts to prevent acid modification of the starch under the elevated temperature conditions of the drying procedure. This can be accomplished by washing or by neutralizing with any suitable alkaline reagent, such as sodium, potassium or calcium hydroxide, sodium carbonate or bicarbonate, or the like, preferably to a pH of at least about 4 and up to about 6. The nitrogenated starch acid salt derivatives can then be separated from the reaction slurry, washed, and dried in any convenient manner.

The acid salts vary in their properties according to the particular acid employed, some, like the HCl, $H_2SO_4$ and $HNO_3$ salts, gelatinizing more readily than others. Those which, like the parent base, do not gelatinize readily, are useful where a dry starch is desirable, as, for example, in dusting powders, since, when wetted, they do not swell and become gummy or slick.

Some of the salts, such as the hydrochloride, the nitrate, the phosphate, the sulfamate and the sulfite, are paste-forming, and possess the marked advantage, as compared with the untreated high-amylose content starch, of considerably reduced gelatinization temperature. Gelatinization takes place at temperatures substantially below the boiling point of the aqueous starch slurry at ambient pressure, in some cases below the gelatinization temperature of low-amylose content starches. The pastes are stable, exhibiting no appreciable separation of the starch, and are substantially free from set-back, the gels remaining fluid after cooling and standing. Unlike the negative, untreated starch pastes, the modified starch derivatives, being cationic, possess a particular affinity for negatively charged materials, such as cellulose. Many of our modified starch pastes, particularly when prepared from high-amylose content starches treated with the cyanamide at a pH of about 10 or higher, are characterized by substantially higher viscosity than the untreated starch pastes. A particular advantage of our invention stems from the fact that modified high-amylose content starch products for specific applications can be tailored by such means as varying the degree of nitrogen substitution, the particular acid employed in forming the acid salt derivative, and the like.

The cationic, paste-forming, nitrogenated, high-amylose content starch acid salts are useful wherever conventional starch pastes are employed and particularly in textile printing gums and warp sizing, as a beater additive and in coatings in paper making, in adhesives, as a salad dressing base, in ore beneficiation and water purification and the like.

EXAMPLE 1

A solution of calcium cyanamide was prepared by slurrying 200 gms. of powdered CaNCN in 1200 mls. of water for 30 minutes at 78° F., filtering, and washing the filter cake with 200 mls. of water, which were added to the filtrate. The extract, 1,160 mls., contained 1.45 moles of cyanamide. 900 gms. (5 moles) of 50% amylose starch were slurried in the aqueous calcium cyanamide extract. The pH of the slurry was 11.0. After reaction at 78° F. for 16 hrs., pH was 11.7. The pH of the reaction mixture was reduced to 2.0 with HCl to form the hydrochloride salt. After 1 hr., the slurry was filtered, washed, and dried to 10% moisture.

EXAMPLE 2

The same procedure was employed as in Example 1 except that the amount of CaNCN was reduced to 100 gms. 1,225 mls. of the aqueous extract contained 0.757 mole of cyanamide. The pH of the starch slurry was 10.5. After a reaction period of 16 hours, the pH was 11.1.

EXAMPLE 3

The same procedure was employed as in Example 1 except that the CaNCN was reduced to 75 gms. 1,240 mls. of the aqueous extract contained 0.615 mole of cyanamide. The pH of the aqueous starch slurry was 11.0. After a reaction period of 16 hours, the pH was 11.4.

EXAMPLE 4

The same procedure was employed as in Example 1 except that the CaNCN was reduced to 50 gms. 1,220 mls. of the aqueous extract contained 0.416 mole of cyanamide. The pH of the aqueous starch slurry was 10.8. After a reaction period of 16 hours, the pH was 11.1.

EXAMPLE 5

200 gms. of powdered CaNCN were slurried in 2000 mls. of water for 30 minutes at 78° F. The solution was filtered, the filter cake washed with 200 mls. of water, and the washings combined with the filtrate. 2,135 mls. of the aqueous extract contained 1.567 moles cyanamide.

900 gms. of 50% amylose starch were slurried in the extract (pH 10.8) for 4 hours at 120° F., at which time pH of the slurry was 11.5. The pH was then reduced to 2.0 with HCl for 1 hour. The slurry was filtered, washed and dried to 10% moisture.

Table I summarizes the characteristics of the products obtained in Examples 1 to 5 and compares them with the untreated 50% amylose starch (A) and Dent corn starch (B) which averages 27% amylose.

The products were tested on a standard Corn Industry Viscosimeter (CIV) to determine the initial temperature of gelatinization (IT, ° C.) the temperature at peak viscosity (MT, ° C.), peak viscosity (MV gram-centimeters), and the viscosity with continued stirring 20 minutes after the paste reached peak viscosity (20″V gram-centimeters). Set-back of the paste was checked after 24 hours of standing at 78° F. to determine whether the paste was still fluid or had set into a stiff gel. The pH of the starch dispersion was determined by glass electrode both before and after cooking on the CIV.

Cationicity was determined by electrolysis of a cooked 2% starch product dispersion. In addition, cationicity was tested by determining the number of mls. of 0.5% starch product solution retained completely by 100 mls. of a 1% dispersion of Solkafloc fibers (a highly purified cellulose) after 5 minutes of stirring. Iodine was added to the starch-Solkafloc dispersions. A colorless filtrate indicated complete removal of the starch product by the cellulose fibers. These results are given under the heading Substantivity in the table.

Table II summarizes the characteristics of the products obtained and compares them with the untreated starch.

*Table II*

| Product | Untreated Starch | A | B | C |
|---|---|---|---|---|
| N₂% D. B | 0.091 | 0.121 | 0.583 | 0.738 |
| CIV, percent starch | | 3.3 | 5.4 | 3.3 |
| IT, ° C | | ¹>92° C. | 81.5 | 66.5 |
| MT, ° C | | | 87.0 | 79.5 |
| MV, gm./cm | | | 65.0 | 280 |
| 20″ V, gm./cm | | | 25.0 | 105 |
| pH: Slurry | 6.2 | 6.4 | 4.3 | 3.8 |
| Paste | | | 6.0 | 6.0 |
| Sign of charge | | | + | + |
| Substantivity, mls | | | 2.5 | 4 |

¹ Heated to above 92° C. but did not gelatinize to form a paste.

It will be noted that both the untreated 50% amylose starch and the starch treated with cyanamide at an acid pH (A) did not gelatinize to form a paste at cooking temperatures above 92° C. The later also showed a negligible nitrogen add-on.

EXAMPLE 7

1200 mls. of the aqueous cyanamide extract prepared in Example 6 were adjusted to pH 11.0 with NaOH. 900 gms. of 50% amylose corn starch were slurried into the cyanamide solution and stirred for 15 minutes at 78° F.

*Table I*

| Product | A | 1 | 2 | 3 | 4 | 5 | B |
|---|---|---|---|---|---|---|---|
| N2% D.B | 0.091 | 1.186 | 0.921 | 0.743 | 0.543 | 0.782 | 0.06 |
| Moles N2/100 AGU | | 6.85 | 5.35 | 4.3 | 3.15 | 4.55 | |
| CIV, percent starch | | 3.3 | 5.4 | 5.4 | 5.4 | 5.4 | 5.4 |
| IT, ° C | ¹>92 | 61.0 | 65.0 | 69.0 | 73.0 | 67.0 | 87.0 |
| MT, ° C | | 75.0 | 79.0 | 79.0 | 86.0 | 80.0 | 90.0 |
| MV, gm./cm | | 330 | 290 | 620 | 390 | 620 | 160 |
| 20″V, gm./cm | | 90 | 140 | 350 | 300 | 400 | 160 |
| pH: slurry | 6.2 | 3.8 | 3.5 | 3.6 | 3.8 | 3.7 | 4.8 |
| paste | | 6.0 | 4.9 | 5.6 | 5.8 | 5.9 | 5.4 |
| Sign of Charge | | + | + | + | + | + | — |
| Substantivity, mls | | 7.5 | 1.5 | 1.0 | 0.5 | 2.0 | 0.0 |
| Paste after 24 hrs | | Fluid | Fluid | Fluid | Fluid | Fluid | Stiff Gel |

¹ Heated to above 92° C. but did not gelatinize to form a paste.

It will be noted from Table I that high-amylose content starch when treated with as little as 6.2% CaNCN (Example 4) gelatinizes at 73° C. By comparison the untreated 50% amylose corn (A) did not gelatinize at temperatures above 92° C. and the 27% Dent corn gelatinzed at 87° C. The viscosities of the treated pastes were also excellent. Unlike the Dent corn paste, the treated pastes remained fluid after cooling and standing for 24 hours.

EXAMPLE 6

800 gms. CaNCN were slurried in 4 liters of water at 78° F. for 30 minutes. The pH of the slurry was reduced to 5.0 with $CO_2$. The slurry was filtered, the filter cake washed with 400 mls. of water, and the washings combined with the filtrate. 4,800 mls. of the extract contained 6.40 moles cyanamide. The aqueous cyanamide solution was divided into 1200 ml. portions, three of which were labelled A, B, and C.

900 gms. of 50% amylose corn starch were slurried in portion A, pH 5.1, and allowed to react for 16 hours at 78° F. The pH was reduced to 2.0 with HCl for 1 hour. The slurry was filtered, washed, and dried to 10% moisture.

Solution B was adjusted to pH 8.5 with NaOH and then slurried with 900 gms. 50% amylose corn starch. After a reaction period of 16 hours, the pH was reduced to 2.0 for 1 hour. The slurry was then filtered, washed, and dried to 10% moisture.

The starch was filtered and dried, without washing, in a stream of hot air to 10% moisture content. The nitrogenated starch was then reslurried in water and the pH adjusted to 2.0 with HCl for 1 hour. The granules were then filtered, washed, and dried to 10% moisture. The percent nitrogen on a dry basis of the HCl salt was 0.886, as compared with 0.091% for the untreated starch. The treated starch gelatinized at 78° F. to form a cationic fluid gel having a substantivity of 5.5 mls.

EXAMPLE 8

1000 gms. CaNCN were slurried in 6000 mls. of water for 30 minutes at 78° F. The solution was filtered, the filter cake washed with 1000 mls. of water, and the washings added to the filtrate. There were 8.04 moles of cyanamide in the filtrate.

4500 gms. of 50% amylose corn starch were slurried in the cyanamide solution, pH 11.4. After 16 hours of reaction time, at which point the pH was 11.9, the starch slurry was divided into 10 equal parts. Sample A was washed and dried to 10% moisture. All the other samples were taken to pH 2.0 with an acid, as listed below, washed and dried to 10% moisture.

A: parent base  
B: HCl  
C: 20% sulfuric acid  
D: nitric acid  
E: acetic acid  
F: carbon dioxide  
G: sulfur dioxide  
H: phosphoric acid  
I: sulfamic acid  
J: phenol Table III summarizes the characteristics of the products obtained.

Table III

| Product | A | B | C | D | E | F | G | H | I | J |
|---|---|---|---|---|---|---|---|---|---|---|
| $N_2$% D.B. | 0.706 | 0.783 | 0.760 | 0.895 | 0.754 | 0.661 | 0.737 | 0.680 | 0.982 | 0.642 |
| CIV, percent starch | 5.4 | 5.4 | 5.4 | 5.4 | 5.4 | 5.4 | 5.4 | 5.4 | 5.4 | 5.4 |
| IT, °C | ¹92° | 65.0 | ¹92° | 66.0 | ¹92° | ¹92° | 82.5 | 72.0 | 68.0 | ¹92° |
| MT, °C | | 77.0 | | 78.5 | | | 90.0 | 84.0 | 76.0 | |
| MV, gm./cm | | 1,200 | | 1,110 | | | 25 | 185 | 860 | |
| 20″V, gm./cm | | 430 | | 450 | | | 5 | 40 | 580 | |
| pH:Slurry | 11.4 | 3.9 | 4.9 | 3.8 | 5.5 | 7.8 | 4.6 | 3.8 | 3.7 | 7.8 |
| Paste | | 5.9 | | 5.9 | | | 6.3 | 6.1 | 5.8 | |
| Substantivity, mls. | | 6 | | 6 | | | 2.5 | 4 | 7 | |
| Sign of Charge | | + | | + | | | + | + | + | |

¹ Did not gelatinize at temperatures up to 92° C.

The preparation of nitrogenated granular starch products from ungelatinized starches is generically disclosed and claimed in our copending application Serial No. 786,927, filed January 15, 1959, and the preparation of nitrogenated galatinized starches and other polymeric hydrophilic colloids is disclosed and claimed in our copending application Serial No. 786,926, filed January 15, 1959, but the aforesaid applications do not specifically disclose the preparation of nitrogenated high amylose starches having an amylose content of at least 50% as claimed herein.

Although this invention has been described with reference to illustrative embodiments thereof, it will be apparent to those skilled in the art that the principles of this invention can be embodied in other forms but within the scope of the claims.

We claim:

1. The cationic, nitrogenated product produced by reacting starch having an amylose content of at least about 50% with an aqueous alkaline solution of cyanamide.

2. The cationic, nitrogenated product produced by reacting starch containing at least about 50% amylose with an aqueous alkaline solution of calcium cyanamide.

3. The acid salt produced by acidification of the reaction product of claim 1.

4. The acid salt produced by acidification of the reaction product of claim 2.

5. The acid salt produced by acidification of the reaction product of claim 2 with an acid selected from the group consisting of hydrochloric acid, sulfurous acid, nitric acid, phosphoric acid and sulfamic acid.

References Cited in the file of this patent

UNITED STATES PATENTS

| 2,538,903 | Gaver et al. | Jan. 23, 1951 |
| 2,894,944 | Paschall | July 14, 1959 |

FOREIGN PATENTS

| 508,977 | Canada | Jan. 11, 1955 |